US009562187B2

(12) United States Patent
McCrary et al.

(10) Patent No.: US 9,562,187 B2
(45) Date of Patent: Feb. 7, 2017

(54) MANUFACTURE OF POLYMER COATED PROPPANTS

(75) Inventors: Avis Lloyd McCrary, Montgomery, TX (US); Robert Ray McDaniel, Cypress, TX (US)

(73) Assignee: Preferred Technology, LLC, Radnor, PA (US)

( * ) Notice: Subject to any disclaimer, the term of this patent is extended or adjusted under 35 U.S.C. 154(b) by 830 days.

(21) Appl. No.: 13/355,969

(22) Filed: Jan. 23, 2012

(65) Prior Publication Data
US 2013/0186624 A1    Jul. 25, 2013

(51) Int. Cl.
*C09K 8/80* (2006.01)

(52) U.S. Cl.
CPC ..................... *C09K 8/805* (2013.01)

(58) Field of Classification Search
None
See application file for complete search history.

(56) References Cited

U.S. PATENT DOCUMENTS

| | | |
|---|---|---|
| 2,163,972 A | 6/1939 | Anderson |
| 2,366,007 A | 12/1944 | D'Alelio |
| 2,653,089 A | 9/1953 | Bulson |
| 2,823,753 A | 2/1958 | Henderson |
| 3,026,938 A | 9/1958 | Huitt |
| 3,020,250 A | 2/1962 | Norwalk |
| 3,392,148 A | 7/1968 | Hunter |
| 3,763,072 A | 10/1973 | Krieger |
| 3,805,531 A | 4/1974 | Kistner |
| 3,817,939 A | 6/1974 | Allen et al. |
| 3,837,892 A | 9/1974 | Marzocchi |
| 3,900,611 A | 8/1975 | Corbett et al. |
| 3,929,191 A | 12/1975 | Graham |
| 3,931,428 A | 1/1976 | Reick |
| 3,971,751 A | 7/1976 | Isayama et al. |
| 3,976,135 A | 8/1976 | Anderson |
| 3,991,225 A | 11/1976 | Blouin |
| 4,074,760 A | 2/1978 | Copeland |
| 4,113,014 A | 9/1978 | Kubens |
| 4,177,228 A | 12/1979 | Prolss |
| 4,199,484 A | 4/1980 | Murphey |
| 4,252,655 A | 2/1981 | Carney |
| 4,273,910 A | 6/1981 | Lederer |
| 4,417,992 A | 11/1983 | Bhattacharyya et al. |
| 4,443,347 A | 4/1984 | Underdown |
| 4,465,815 A | 8/1984 | Chattha |
| 4,493,875 A | 1/1985 | Beck et al. |
| 4,518,039 A | 5/1985 | Graham |
| 4,554,188 A | 11/1985 | Holubka et al. |
| 4,585,064 A | 4/1986 | Graham et al. |
| 4,592,931 A | 6/1986 | Cargle |
| 4,594,268 A | 6/1986 | Kirwin |
| 4,732,920 A | 3/1988 | Graham et al. |
| 4,746,543 A | 5/1988 | Zinkan et al. |
| 4,785,884 A | 11/1988 | Armbruster |
| 4,792,262 A | 12/1988 | Kapps et al. |
| 4,801,635 A | 1/1989 | Zinkan et al. |
| 4,822,425 A | 4/1989 | Burch |
| 4,920,192 A | 4/1990 | Wiser-Halladay |
| 5,048,608 A | 9/1991 | Wiser-Halladay |
| 5,092,404 A | 3/1992 | Falk et al. |
| 5,138,055 A | 8/1992 | Parekh |
| 5,181,957 A | 1/1993 | Gross et al. |
| 5,188,175 A | 2/1993 | Sweet |
| 5,194,174 A | 3/1993 | Roe et al. |
| 5,199,491 A | 4/1993 | Kutta |
| 5,218,038 A | 6/1993 | Johnson et al. |
| 5,242,248 A | 9/1993 | Bramwell |
| 5,256,729 A | 10/1993 | Kutta |
| 5,264,572 A | 11/1993 | Endo et al. |
| 5,330,836 A | 7/1994 | Buese et al. |
| 5,420,174 A | 5/1995 | Dewprashad |
| 5,422,183 A | 6/1995 | Sinclair et al. |
| 5,480,584 A | 1/1996 | Urano et al. |
| 5,582,249 A | 12/1996 | Caveny |
| 5,597,784 A | 1/1997 | Sinclair et al. |
| 5,721,315 A | 2/1998 | Evans et al. |
| 5,728,302 A | 3/1998 | Connor et al. |
| 5,733,952 A | 3/1998 | Geoffrey |
| 5,824,462 A | 10/1998 | Ashida et al. |

(Continued)

FOREIGN PATENT DOCUMENTS

| | | |
|---|---|---|
| EP | 0207668 A1 | 1/1987 |
| EP | 2469020 A1 | 6/2012 |

(Continued)

OTHER PUBLICATIONS

Wingenfelder, Ulla et al., Removal of Heavy Metals from Mine Waters by Natural Zeolites, Environ. Sci. Technol., 2005, vol. 39, 4606-4613.
Halimoon, Normala, Removal of Heavy Metals from Textile Wastewater Using Zeolite, EnvironmentAsia 3(special issue) 2010, 124-130.
Sanchez, Mariano, FRAC Packing: Fracturing for Sand Control, Middle East and Asia Reservoir Review, Nov. 8, 2007, pp. 37-49.
Interstate Oil and Gas Compact Commission and All Consulting, A Guide to Practical Management of Produced Water from Onshore Oil and Gas Operations in the United States, Oct. 2006.
Boster, Ronald S., A Study of Ground-Water Contamination Due to Oil-Field Brines in Morrow and Delaware Counties, Ohio, With Emphasis on Detection Utilizing Electrical Resistivity Techniques, The Ohio State University, 1967.
EPA, Oil and Gas Extraction, Compliance and Enforcement History, Sector Notebook Project, Oct. 2000, pp. 115-155.
Huntsman, The JEFFAMINE Polyetheramines, 2007.
International Search Report issued in PCT/US12/70844 dated Mar. 8, 2013.

(Continued)

*Primary Examiner* — Erma Cameron
(74) *Attorney, Agent, or Firm* — Pepper Hamilton LLP

(57) ABSTRACT

Solid proppants are coated in a process that includes the steps of: (a) coating free-flowing proppant solids with a first component of either a polyol or an isocyanate in mixer; (b) adding a second component of either an isocyanate or a polyol that is different from the first component at a controlled rate or volume sufficient to form a polyurethane coating on the proppant solids; and (c) adding water at a rate and volume sufficient to retain the free-flowing characteristics of the proppant solids.

16 Claims, No Drawings

(56) References Cited

U.S. PATENT DOCUMENTS

| | | |
|---|---|---|
| 5,837,656 A | 11/1998 | Sinclair et al. |
| 5,849,818 A | 12/1998 | Walles et al. |
| 5,856,271 A | 1/1999 | Cataldo et al. |
| 5,911,876 A | 6/1999 | Rose |
| 5,924,488 A | 7/1999 | Nguyen |
| 5,955,144 A | 9/1999 | Sinclair et al. |
| 6,071,990 A | 6/2000 | Yip et al. |
| 6,079,492 A | 6/2000 | Hoogteijling |
| 6,093,469 A | 7/2000 | Callas |
| 6,093,496 A | 7/2000 | Dominguez et al. |
| 6,114,410 A | 9/2000 | Betzold |
| 6,127,308 A | 10/2000 | Slack et al. |
| 6,187,892 B1 | 2/2001 | Markusch et al. |
| 6,207,766 B1 | 3/2001 | Doi et al. |
| 6,270,692 B1 | 8/2001 | Geissler et al. |
| 6,306,964 B1 | 10/2001 | Evans |
| 6,372,842 B1 | 4/2002 | Grisso et al. |
| 6,387,501 B1 | 5/2002 | McCrary |
| 6,406,789 B1 | 6/2002 | McDaniel |
| 6,486,287 B2 | 11/2002 | McGall et al. |
| 6,528,157 B1 | 3/2003 | Hussain |
| 6,582,819 B2 | 6/2003 | McDaniel |
| 6,632,527 B1 | 10/2003 | McDaniel |
| 6,668,926 B2 | 12/2003 | Nguyen |
| 6,705,400 B1 | 3/2004 | Nguyen |
| 6,732,800 B2 | 5/2004 | Acock et al. |
| 6,767,978 B2 | 7/2004 | Aubart et al. |
| 6,790,245 B2 | 9/2004 | Wolff et al. |
| 6,809,149 B2 | 10/2004 | Meyer et al. |
| 6,866,099 B2 | 3/2005 | Nguyen |
| 7,012,043 B2 | 3/2006 | Klein |
| 7,074,257 B2 | 7/2006 | Lockwood et al. |
| 7,078,442 B2 | 7/2006 | Brown |
| 7,129,308 B2 | 10/2006 | McGall et al. |
| 7,135,231 B1 | 11/2006 | Sinclair |
| 7,153,575 B2 | 12/2006 | Anderson |
| 7,157,021 B2 | 1/2007 | Bytnar et al. |
| 7,216,711 B2 | 5/2007 | Nguyen |
| 7,244,492 B2 | 7/2007 | Sinclair et al. |
| 7,261,156 B2 | 8/2007 | Nguyen |
| 7,270,879 B2 | 9/2007 | McCrary |
| 7,281,581 B2 | 10/2007 | Nguyen |
| 7,318,472 B2 | 1/2008 | Smith |
| 7,318,474 B2 | 1/2008 | Welton |
| 7,322,411 B2 | 1/2008 | Brannon |
| 7,326,346 B2 | 2/2008 | Lovell et al. |
| 7,332,089 B2 | 2/2008 | Harjula et al. |
| 7,334,635 B2 | 2/2008 | Nguyen |
| 7,334,783 B2 | 2/2008 | Yoneyama et al. |
| 7,343,973 B2 | 3/2008 | Dusterhoft |
| 7,344,783 B2 | 3/2008 | Shea |
| 7,350,571 B2 | 4/2008 | Nguyen |
| 7,407,010 B2 | 8/2008 | Rickman |
| 7,528,096 B2 | 5/2009 | Brannon |
| 7,537,702 B2 | 5/2009 | Lupton et al. |
| 7,624,802 B2 | 12/2009 | McCrary |
| 7,678,872 B2 | 3/2010 | Glass et al. |
| 7,721,804 B2 | 5/2010 | Duenckel |
| 7,726,399 B2 | 6/2010 | Brannon |
| 7,754,659 B2 | 7/2010 | Rediger |
| 7,772,163 B1 | 8/2010 | Brannon |
| 7,789,147 B2 | 9/2010 | Brannon |
| 7,803,742 B2 | 9/2010 | Bicerano et al. |
| 7,884,043 B2 | 2/2011 | Lisetskiy et al. |
| 7,896,080 B1 | 3/2011 | Watters et al. |
| 7,919,183 B2 | 4/2011 | McDaniel |
| 7,921,910 B2 | 4/2011 | Wilson et al. |
| 7,999,013 B2 | 8/2011 | Brown |
| 8,006,754 B2 | 8/2011 | Bicerano |
| 8,006,755 B2 | 8/2011 | Bicerano |
| 8,052,890 B2 | 11/2011 | Nguyen |
| 8,133,587 B2 | 3/2012 | Rediger et al. |
| 8,183,179 B2 | 5/2012 | Garcia-Lopez De Victoria et al. |
| 8,258,206 B2 | 9/2012 | Kanagasabapathy et al. |
| 8,298,667 B2 | 10/2012 | Smith et al. |
| 8,338,351 B2 | 12/2012 | Kanagasabapathy et al. |
| 8,349,911 B2 | 1/2013 | Kuehnle |
| 8,354,279 B2 | 1/2013 | Nguyen et al. |
| 8,360,149 B2 | 1/2013 | Hughes et al. |
| 8,431,220 B2 | 4/2013 | Wu et al. |
| 8,513,342 B2 | 8/2013 | Gao et al. |
| 8,763,700 B2 | 7/2014 | McDaniel et al. |
| 8,936,083 B2 | 1/2015 | Nguyen |
| 9,040,467 B2 | 5/2015 | McDaniel et al. |
| 2001/0014453 A1 | 8/2001 | McGall et al. |
| 2002/0048676 A1 | 4/2002 | McDaniel |
| 2003/0102128 A1 | 6/2003 | Dawson et al. |
| 2003/0131998 A1 | 7/2003 | Nguyen |
| 2003/0196805 A1 | 10/2003 | Boney |
| 2003/0224165 A1 | 12/2003 | Anderson |
| 2004/0010267 A1 | 1/2004 | Nakamura et al. |
| 2004/0129923 A1 | 7/2004 | Nguyen et al. |
| 2004/0138343 A1 | 7/2004 | Campbell et al. |
| 2005/0018193 A1 | 1/2005 | Chilese et al. |
| 2005/0019574 A1 | 1/2005 | McCrary |
| 2005/0173116 A1 | 8/2005 | Nguyen et al. |
| 2005/0274523 A1 | 12/2005 | Brannon et al. |
| 2006/0035790 A1 | 2/2006 | Okell et al. |
| 2006/0073980 A1 | 4/2006 | Brannon et al. |
| 2006/0157243 A1 | 7/2006 | Nguyen |
| 2006/0241198 A1 | 10/2006 | Motz et al. |
| 2007/0021309 A1 | 1/2007 | Bicerano |
| 2007/0034373 A1 | 2/2007 | McDaniel et al. |
| 2007/0036977 A1 | 2/2007 | Sinclair et al. |
| 2007/0066742 A1 | 3/2007 | Mhetar et al. |
| 2007/0073590 A1 | 3/2007 | Cosentino et al. |
| 2007/0088137 A1 | 4/2007 | Georgeau et al. |
| 2007/0161515 A1 | 7/2007 | Bicerano |
| 2007/0204992 A1 | 9/2007 | Davis |
| 2007/0208156 A1 | 9/2007 | Posey |
| 2007/0209794 A1 | 9/2007 | Kaufman |
| 2007/0215354 A1 | 9/2007 | Rickman |
| 2007/0228322 A1 | 10/2007 | Chaves et al. |
| 2007/0289781 A1* | 12/2007 | Rickman et al. ............... 175/65 |
| 2008/0011478 A1 | 1/2008 | Welton et al. |
| 2008/0063868 A1 | 3/2008 | Chung et al. |
| 2008/0087429 A1 | 4/2008 | Brannon et al. |
| 2008/0202744 A1 | 8/2008 | Crews |
| 2008/0202750 A1 | 8/2008 | Rediger |
| 2008/0230223 A1 | 9/2008 | McCrary |
| 2008/0236825 A1 | 10/2008 | Barmatov et al. |
| 2009/0044942 A1 | 2/2009 | Gupta |
| 2009/0176667 A1 | 7/2009 | Nguyen |
| 2009/0238988 A1 | 9/2009 | McDaniel |
| 2010/0065271 A1 | 3/2010 | McCrary |
| 2010/0147507 A1 | 6/2010 | Korte et al. |
| 2010/0196621 A1 | 8/2010 | Larson-Smith et al. |
| 2010/0212898 A1 | 8/2010 | Nguyen et al. |
| 2010/0282462 A1 | 11/2010 | Xu et al. |
| 2010/0286000 A1 | 11/2010 | Huang et al. |
| 2011/0016837 A1 | 1/2011 | Fischer et al. |
| 2011/0024129 A1 | 2/2011 | Turakhia et al. |
| 2011/0053809 A1 | 3/2011 | Sanders et al. |
| 2011/0120719 A1* | 5/2011 | Soane .................... C09K 8/805 166/308.1 |
| 2011/0160097 A1 | 6/2011 | Mirzaei et al. |
| 2011/0162837 A1 | 7/2011 | O'Malley et al. |
| 2011/0244125 A1 | 10/2011 | Weisenberg |
| 2011/0272146 A1 | 11/2011 | Green |
| 2011/0297383 A1 | 12/2011 | Tanguay |
| 2012/0018162 A1 | 1/2012 | Tanguay |
| 2012/0277130 A1 | 11/2012 | Usova |
| 2012/0279703 A1 | 11/2012 | McDaniel et al. |
| 2012/0283153 A1 | 11/2012 | McDaniel et al. |
| 2012/0322925 A1 | 12/2012 | Arigo et al. |
| 2013/0005856 A1 | 1/2013 | Phonthammachai et al. |
| 2013/0037048 A1 | 2/2013 | Edgington et al. |
| 2013/0045901 A1 | 2/2013 | Bicerano |
| 2013/0048365 A1 | 2/2013 | Kim et al. |
| 2013/0065800 A1 | 3/2013 | McDaniel et al. |
| 2013/0081812 A1* | 4/2013 | Green et al. ............... 166/280.1 |
| 2013/0164449 A1 | 6/2013 | Tadepalli et al. |
| 2013/0184381 A1 | 7/2013 | Bilodeau et al. |
| 2013/0186624 A1 | 7/2013 | McCrary et al. |

(56) References Cited

U.S. PATENT DOCUMENTS

| | | |
|---|---|---|
| 2013/0203917 A1 | 8/2013 | Harris et al. |
| 2013/0233545 A1 | 9/2013 | Mahoney et al. |
| 2013/0312974 A1 | 11/2013 | McClung, IV |
| 2014/0060826 A1 | 3/2014 | Nguyen |
| 2014/0162911 A1 | 6/2014 | Monastiriotis et al. |
| 2014/0262247 A1 | 9/2014 | Duenckel et al. |
| 2014/0274819 A1 | 9/2014 | McCrary et al. |
| 2014/0305650 A1 | 10/2014 | Song et al. |
| 2014/0338906 A1 | 11/2014 | Monastiriotis et al. |
| 2015/0034314 A1 | 2/2015 | Hudson et al. |
| 2015/0119301 A1 | 4/2015 | Mcdaniel et al. |

FOREIGN PATENT DOCUMENTS

| | | |
|---|---|---|
| GB | 1294017 A | 10/1972 |
| WO | 2005121272 A1 | 12/2005 |
| WO | 2010/049467 | 5/2010 |
| WO | 2013048365 A1 | 4/2013 |
| WO | 2013112251 A1 | 8/2013 |
| WO | 2013158306 A1 | 10/2013 |
| WO | 2014144464 A2 | 9/2014 |

OTHER PUBLICATIONS

AkzoNobel Declaration of Compliance Bindzil CC401, Eka Chemical, Jan. 27, 2010, pp. 1-4.

AkzoNobel Silane Modified Colloidal Silca Bindzil CC in Waterborne Coating Applications Use and Benefits, 2011, pp. 1-6.

Cao et al., Mesoporous Sio2-supported Pt Nanoparticles for catalytic application, ISRN Nanomaterials, 2013, Article ID 745397, 7 pages.

Hui et al., Removal of mixed heavy metal ions in wasterwater by zeolite 4A and residual products from recycled coal fly ash, Jounal of Hazardous Materials, Aug. 1, 2005, vol. B124, pp. 89-101.

International Search Report and Written Opinion issued in PCT/US2012/036093 dated Aug. 14, 2012.

International Search Report and Written Opinion issued in PCT/US2012/047519 dated Nov. 2, 2012.

International Search Report and Written Opinion issued in PCT/US2012/053277 dated Nov. 20, 2012.

Kuang et al., Controllable fabrication of SnO2-coated multiwalled carbon nanotubes by chemical vapor deposition, carbon 2006 44(7):1166-1172.

Madaan and Tyagi, Quaternary pryidinium salts: a review, J Oleo Sci 2008 57(4):197-215.

Mellaerts et al., Enhanced release of itraconazole from ordered mesoporous SBA-15 silica materials, Chem Commun 2007 7(13):1375-7.

Notice of Allowance dated Dec. 22, 2015 in U.S. Appl. No. 13/626,055.

Official Action datd Nov. 30, 2015 from U.S. Appl. No. 14/798,774.

Polyurethanes, Ullmann's Encyclopedia of Industrial Chemistry, 2012, vol. 29.

Wikipedia, ion-exchange resin, en.wikipedia.org/wikillon_exchange_resins, pp. 1-5, no date given.

Wikipedia, Piezoelectricity, en.wikipedia.org.wiki/Piezoelectricity, pp. 1-15, no date given.

Chemicalland21, "Lauryl alcohol ethoxylates" Mar. 18, 2006, https://web.archive.org/web/200603180233341http://www.chemicalland21.com/specialtychem/perchem/LAURYL%20ALCOHOL%20ETHOXYLATE.htm.

Non-Final Office Action dated Aug. 25, 2016 in U.S. Appl. No. 15/073,840.

Ramirez et al., Synthesis of crosslinked and functionalized polystyrene by miniemulsion polymerization: particle size control, Macromex 2014. Dec. 2014.

Sigma-Aldrich, "Polybutadiene, hydroxyl terminated" Jun. 8, 2014, https://web.archive.org/web/20140608155646/http:productialdrich/190799?lang=en&region=).

Non-Final Office Action dated Apr. 5, 2016 in U.S. Appl. No. 14/314,573.

Non-Final Office Action dated Apr. 5, 2016 in U.S. Appl. No. 13/897,288.

Final Office Action dated Apr. 18, 2016 in U.S. Appl. No. 14/798,774.

Final Office Action dated May 3, 2016 in U.S. Appl. No. 14/266,179.

Final Office Action dated May 27, 2016 in U.S. Appl. No. 13/837,396.

Notice of Allowance dated Aug. 8, 2016 in U.S. Appl. No. 13/837,396.

* cited by examiner

MANUFACTURE OF POLYMER COATED PROPPANTS

FIELD OF INVENTION

The invention relates to a method for the production of polymer coated proppants and similar coatings that benefit from the presence of water or a reactive liquid as a polymerization aid.

BACKGROUND OF THE INVENTION

Coated proppants are often used in hydraulic well fracturing to increase production rate of the well. Recently, we have discovered that cured, commercially acceptable, coatings can be applied to proppants using the polyurethane reaction products of polyols and isocyanates. The details of these processes are disclosed in our co-pending U.S. patent application Ser. No. 13/099,893 (entitled "Coated and Cured Proppants"); Ser. No. 13/188,530 (entitled "Coated and Cured Proppants") and Ser. No. 13/224,726 (entitled "Dual Function Proppants"), the disclosures of which are herein incorporated by reference. Such polyurethane-based proppant coatings are economically and environmentally desirable for a number of reasons, all of which suggest that the development and use of such coating would be highly desirable.

There are many devices, techniques and addition schemes that can be used to bring the reactants into contact with the finely divided, proppant substrate solids. One such device is an electrically powered tumble mixer into which are added the solids and the first coating reactant (typically the polyol component) along with any auxiliary components. After the solids are thoroughly mixed, the second reactant (typically the isocyanate) is metered in to control the polymerization rate of the polyurethane coating on the proppant solid core.

This metering process is important because the polymerization process increases the viscosity of the tumbling, coated, proppant solids with an attendant increase in the power demanded by the mixer device. An overly aggressive addition rate of the second reactant or miscalculation in the amount of proppant sought to be coated in a batch can foul the mixer and burn out the mixer motor as the polymerization reaction proceeds with the attendant viscosity increase. Mixer repair or replacement are expensive propositions that can materially affect the production and economic efficiencies of a proppant coating plant. Adding the second component too quickly can also form viscous, resinous masses of coated solids that adhere to the walls and arms of the mixer. Such masses interferes with the efficient operation of the mixer, require more frequent cleaning and can generate oversized solid masses that cannot be used in the final, coated proppant product.

It would be desirable to have a way to mitigate or control the effects on electrically powered equipment due to the formation of oversized, viscous masses and a potentially harmful electrical load demand increase by the mixer that is associated with the polyurethane polymerization reaction on coated proppant solids.

It would also be desirable to have a mitigation technique that can be used in the coating process safely, inexpensively and without environmental consequence to a variety of polyurethane-based coating formulations.

SUMMARY OF THE INVENTION

In a process according to the present invention, water is added at a controlled rate or volume during the polymerization reaction between the polyol and isocyanate components as a processing aid to help form free-flowing, polyurethane-coated, proppant solids with at least reduced or eliminated oversized masses and viscous build-up in the mixer. Foam formation on the surface of the coated proppant solids should be minimized or avoided, if possible, by controlled addition of the water.

In the present process, the addition of water during the proppant coating process has a number of benefits. One is that the water seems to reduce or eliminate the formation of viscous, resinous masses and build-up on mixer walls of coated solids. Such deposits represent waste that reduces process efficiency and productivity. A second benefit is that the water can serve as the vehicle for incorporating additional functionality into the coating, e.g., biocides, catalysts, crosslinking agents, reactive chelating agents, reinforcing agents, fibers and the like. A third benefit is that the water seems to encourage the speed of the crosslinking reactions thereby permitting the efficient coating of individual proppant solids to form free-flowing, coated proppants in a commercially viable time period. This process modification does not affect the quality of the resulting polyurethane coating or the ability of the coated proppant to function properly with high conductivity and commercially acceptable control over flowback.

DETAILED DESCRIPTION OF THE INVENTION

The coating process of the present invention comprises the formation of a polyurethane-based coating on a solid proppant core to form free-flowing, coated, proppant solids with the addition of water during the coating step as a processing aid for the formation of the coated proppants. Water is added at a rate or quantity sufficient to maintain the discrete, free-flowing characteristics of the proppant solids as the coating process proceeds yet avoid the formation of significant amounts of foam. The water also helps to reduce or eliminate the formation of viscous, resinous agglomerates or fouling masses of proppant solids that may be coated with only one of the polyurethane reactants (e.g., the polyol or the isocyanate) or with both components but at ratios that are not conducive to rapid formation of the desired polyurethane coating. Although the precise mechanism by which this effect occurs is not yet conclusively established so the present invention should not be bound by any particular theory of operation, the inventors believe that the water enables the reaction facilitates the formation of polyurea structures and reduces the number of unreacted —NCO bonds which elevates the thermal properties of the coating and helps increase the crosslink density quickly. It may be that the water acts as a reactive stabilizing fluid for these reactions because the final product is dry and free-flowing.

Water addition preferably starts just after the polyol and isocyanate components have begun to contact (e.g., within 5-15 seconds with both completely added within 30-60 seconds for a small mixer) and continues until after the last of the polyol and isocyanate is added to the mixer. This order has shown that it results in less waste due to undesired aggregation of proppant solids and deposits on the mixer walls. Water, at ambient or elevated temperature, can be added by pouring, spraying, or injection, either continuously or intermittently.

The amount of water added is not readily susceptible to firm maximum and minimum limits because each system of mixer and component chemistries may differ from batch to batch and from season to season. In general, however, an amount of water within the range from about 0.02% to about 10% based on the weight of the sand should be generally sufficient and preferably within the range of 0.1-5 wt %, and even more preferably within the range of about 0.15-2 wt % water at ambient atmospheric pressure. More or less water may be correct provided that the solids retain their free-flowing nature as the coating polymerizes in the mixer from heat produced by the reaction and from the sensible heat of the preheated solids. If desired, pressures above atmospheric may be used if the mixing equipment permits for greater control over foam formation.

The added water can be substantially only water or may contain one or more soluble, suspended or emulsified components that provide benefits to the coated proppant or additional functionalities. The water can contain biocides, catalysts, crosslinking agents, fillers, colorants, reactive chelating agents and other agents that remove heavy metals (see copending U.S. patent application Ser. No. 13/224,726 which is hereby incorporated by reference), reinforcing agents, fibers and the like.

In the present invention, the proppant core solid, polyol component, isocyanate component water and any optional additives, reactants, or catalysts become mixed and distributed homogeneously on the surface of the discrete proppant solids where they react and form the desired polyurethane coating. The coating ingredients are preferably kept in motion throughout the entire mixing process and during the addition of the water.

In the presently preferred process, a first component (preferably a polyol, but it could be an isocyanate) is added to free-flowing, discrete, proppant core solids in a mixer until the proppant solids are coated with the first component. The second component (preferably an isocyanate, but it could be the polyol) is then added to begin a polymerization reaction that forms a substantially cured and crosslinked polyurethane coating on the proppant solids. It is possible that the first and second components are both isocyanates so as to form a polycarbodiimide coating on the proppant. See WO 2010049467, the disclosure of which is hereby incorporated by reference.

In an especially preferred process, the coating process starts by metering in a mixture of polyols and, within 5-15 seconds later, begins to meter in an amine catalyst and isocyanate. This gives a more uniform coating with better properties. The water starts about when the isocyanate starts but finishes after the isocyanate addition is completed.

The amount of coating, that is, of the total amount of polyurethane reactants that is applied to a proppant, is preferably between about 0.5 and about 10 wt %, more preferably between about 2 and about 5 wt %, resin relative to the mass of the proppant as 100 wt %.

The coating process of the present invention produces a polyurethane coating on the proppant core solids that is durable and resists dissolution under the rigorous combination of high heat, agitation, abrasion and water found downhole in a well. Preferably, the cured coating exhibits a sufficient resistance to a 10 day autoclave test or 10 day conductivity test so that the coating resists loss by dissolution in hot water ("LOI loss") of less than 25 wt %, more preferably less than 15 wt %, and even more preferably a loss of less than 5 wt %. The substantially cured coating of the invention thus resists dissolution in the fractured stratum while also exhibiting sufficient resistance to flow back and sufficiently high crush strength to maintain conductivity of the fractures.

A preferred testing method for proppant performance is described in ISO 13503-5:2006(E) "Procedures for measuring the long term conductivity of proppants", the disclosure of which is herein incorporated by reference. The ISO 13503-5:2006 provides standard testing procedures for evaluating proppants used in hydraulic fracturing and gravel packing operations. ISO 13503-5:2006 provides a consistent methodology for testing performed on hydraulic fracturing and/or gravel packing proppants. The "proppants" mentioned henceforth in this part of ISO 13503-5:2006 refer to sand, ceramic media, resin-coated proppants, gravel packing media, and other materials used for hydraulic fracturing and gravel-packing operations. ISO 13503-5:2006 is not applicable for use in obtaining absolute values of proppant pack conductivities under downhole reservoir conditions, but it does serve as a consistent method by which such downhole conditions can be simulated and compared in a laboratory setting.

The polyurethane-based coatings of the present invention are unique in many respects. The most important of these is in the ability to generate interparticle bond strength between other proppants having the coating of the present invention under the temperature and stress of downhole conditions. Unlike conventional proppant coatings, this interparticle bonding capability of the present invention is substantially unaffected by premature exposure to heat, even for extended periods. Conventional curable coatings are vulnerable to premature exposure to elevated temperatures for any substantial period of time (e.g., 2-3 hours at 100° C.) prior to coming into contact with other particles and being subjected to a substantial closure stress. Once the conventional coating finishes its curing (where and whenever this occurs) it no longer has the possibility to create particle to particle bonding. The coatings of the present invention do not suffer such a vulnerability. The coating of the invention seems to act as a thermoplastic adhesive that is dry, non-tacky and substantially cured after manufacture yet it can develop appreciable proppant-to-proppant bond strength under downhole conditions that help retain conductivity with control over flowback.

The specific mixer used to coat the proppants is not believed to be critical for the present invention. Suitable mixers include tumbling-type mixers, fluid beds, a pug mill mixer or an agitation mixer can be used. For example, a drum mixer, a plate-type mixer, a tubular mixer, a trough mixer or a conical mixer can be used. The easiest way is mixing in a rotating drum. As continuous mixer, a worm gear can, for example, be used.

A preferred mixer type is a tumbling-type mixer that uses a rotating drum driven by an electrical motor. The load on the motor can be used as a measure of the viscosity of the tumbling solids and the degree to which they are forming agglomerates or resinous deposits inside the mixer: the electrical load on the motor increases as the agglomeration and fouling increase. Adding water to the mixing solids can help to reduce this load increase and retain the free-flowing nature of the mixing solids, thereby enabling even larger productivity from the mixer.

Mixing can be carried out on a continuous or discontinuous basis in series or in several runs with a single mixer. In suitable mixers it is possible, for example, to add adhesion agents, isocyanate, amine and optional ingredients continuously to the heated proppants. For example, isocyanate components, amine reactant and optional additives can be mixed with the proppant solids in a continuous mixer (such as a worm gear) in one or more steps to make one or more layers of cured coating.

The method for the production of coated proppants according to the present invention can be implemented without the use of solvents. Essentially solvent-free means that a coating formulation, before curing, contains less than 20 wt %, preferably less than 10 wt %, more preferably less than 5 wt %, and still more preferably less than 3 wt %, and most preferably less than 1 wt % of solvent, relative to the total mass of components of the mixture.

The temperature and pressure of the coating process are not particularly restricted outside of practical concerns for safety and component integrity. Preferably, the coating step is performed at a temperature of between about 10° C. and about 250° C., or more preferably at a temperature of about 10° C. to about 125° C. This temperature may be achieved by preheating the proppant solids, heating the mixer device and/or heating the water added into the mixer. The use of pre-heated proppant solids at a temperature within the range of 50° to about 225° C. is preferred because the sensible heat of the preheated proppant solids helps to speed the polymerization and curing rate to produce dry, free-flowing, coated proppants in a period of less than about four minutes.

Ambient pressures are generally adequate and sufficient for the present coating process. Higher pressures may be used, if desired, to control foaming or loss of water as steam from the preheated solids. Sub-atmospheric pressures may be used, particularly with porous proppant solids, for assisting penetration of the coating components into the pores of the proppant core.

If desired, the coated proppants can be baked or heated for a period of time sufficient to substantially react at least substantially all of the available isocyanate, hydroxyl and reactive amine groups that might remain in the coated proppant. Such a post-coating cure may occur even if additional contact time with a catalyst is used after a first coating layer or between layers. Typically, the post-coating cure step is performed like a baking step at a temperature within the range from about 100°-200° C. for a time within the range of about 10 minutes to 48 hours, preferably the temperature is about 125°-175° C. for 15 minutes to 2 hours. Even more preferably, the coated proppant is cured for less than one hour and under conditions sufficient to produce a coated proppant that exhibits a loss of coating of less than 25 wt %, preferably less than 15 wt %, and even more preferably less than 5 wt % when tested according to ISO 13503-5:2006(E).

The coating material may be applied in more than one layer. In this case, the coating process is repeated as necessary (e.g. 1-5 times, 2-4 times or 2-3 times) to obtain the desired coating thickness. In this manner, the thickness of the coating of the proppant can be adjusted and used as either a relatively narrow range of proppant size or blended with proppants of other sizes, such as those with more or less numbers of coating layers of polyurethane according to the present invention, so as to form a proppant blend have more than one range of size distribution. A typical range for coated proppant is typically within the range of about 20-70 mesh.

The coated proppants can additionally be treated with surface-active agents or auxiliaries, such as talcum powder or stearate, to improve pourability.

The Polyol Component

A polyol component with polyhydroxy functionality is one of the components used in making a polyurethane coating on proppant solids in a process according to the invention, and it may be applied as the first component or the second component. The polyol component has two or more functional, hydroxyl moieties (such as diols, triols and higher polyol functionality based on starter molecules like glycerine, trimethylolpropane, sorbitol, methyl glucoside and sucrose) excluding hydroxyl groups associated with carboxylic acids and may or may not have reactive amine functionality. Preferred polyhydroxyl polyols include polyethers (such as polyoxypropylene diols and triols), polyesters, aliphatic polyols, aromatic polyols, mixtures of aliphatic and aromatic polyols, synthetic polyols, polyhydroxyoligomers (see U.S. Pat. Nos. 4,554,188 and 4,465,815, the disclosures of which are hereby incorporated by reference), natural oil polyols (such as cashew nut oil and castor oil) and natural oils that have been treated to introduce polyhydroxyl content in place of unsaturated bonds such as oxidized soybean oil, oxidized peanut oil, and oxidized canola oil such as polyols produced from biomass.

A preferred polyurethane coating is made with a polyol mixture that includes 5-100 wt % of one or more polyether, polyester, aliphatic and/or polyhydroxyoligomers polyols and 0-95 wt % of an aromatic polyol. An especially preferred polyol contains 0-50 wt % cashew nut oil, 0-60 wt % aromatic polyol and 20-100% castor oil. It appears that an optimum ratio of castor oil to isocyanate in the coating mixture results in lower LOI loss as well as higher interparticle bond strength than coatings with lower proportions of castor oil in the coating.

A suitable aromatic polyol is described in a patent application that was filed with the German Patent Office under no. DE 10 2010 051 817.4 on Nov. 19, 2010 and entitled "Proppant Coating Technology", the disclosure of which is herein incorporated by reference.

Another suitable polyol component for the present process comprises a phenol resin that comprises a condensation product of a phenol and an aldehyde, such as formaldehyde. The phenol resin is preferably a resole or novolac phenol resin and more preferably a benzyl ether resin.

The resole-type phenol resin can be obtained, for example, by condensation of phenol or of one or more compounds of the following formula (I), with aldehydes, preferably formaldehyde, under basic conditions.

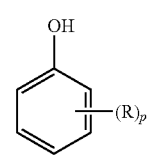

(I)

In the formula (I):

"R" is in each case, independently, a hydrogen atom, a halogen atom, $C_{1-16}$-alkyl (preferably $C_{1-12}$-alkyl, more preferably $C_{1-6}$-alkyl, and still more preferably methyl, ethyl, propyl or butyl) or —OH;

"p" is an integer from 0 to 4, preferably 0, 1, 2 or 3, and more preferably 1 or 2. Those in the art will understand that when p is 0, the compound of formula (I) is phenol.

Novolak-type phenol resin for the present invention comprises the condensation product of phenol or of one or more compounds of the formula (I) defined above, with aldehydes, preferably formaldehyde, under acidic conditions.

In another preferred embodiment, the phenol resin is a benzyl ether resin of the general formula (II):

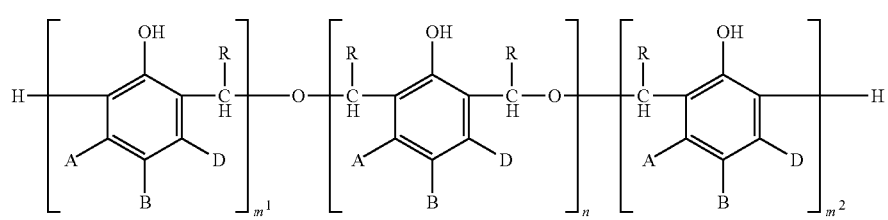

(II)

In the formula (II):

A, B and D each are, independently, a hydrogen atom, a halogen atom, a $C_{1-16}$-hydrocarbon residue, —($C_{1-16}$-alkylene)-OH, —OH, an —O—($C_{1-16}$-hydrocarbon residue), phenyl, —($C_{1-6}$-alkylene)-phenyl, or —($C_{1-6}$-alkylene)-phenylene-OH;

The halogen atom is F, Cl, Br or I;

The $C_{1-16}$-hydrocarbon-residue is preferably $C_{1-16}$-alkyl, $C_{2-16}$-alkenyl or $C_{2-16}$-alkinyl, more preferably $C_{1-12}$-alkyl, $C_{2-12}$-alkenyl or $C_{2-12}$-alkinyl, still more preferably $C_{1-6}$-alkyl, $C_{2-6}$-alkenyl or $C_{2-6}$-alkinyl, and still more preferably $C_{1-4}$-alkyl, $C_{2-4}$-alkenyl or $C_{2-4}$-alkinyl, and still more preferably $C_{1-12}$-alkyl, and still more preferably $C_{1-6}$-alkyl, and still more preferably methyl, ethyl, propyl or butyl, and most preferably methyl;

The residue —($C_{1-16}$-alkylene)-OH is preferably —($C_{1-12}$-alkylene)-OH, more preferably —($C_{1-6}$-alkylene)-OH, and still more preferably —($C_{1-4}$-alkylene)-OH, and most preferably a methylol group (—$CH_2$—OH);

The —O—($C_{1-16}$-hydrocarbon)-residue is preferably $C_{1-16}$-alkoxy, more preferably $C_{1-12}$-alkoxy, and still more preferably $C_{1-6}$-alkoxy, and still more preferably $C_{1-4}$-alkoxy, and still more preferably —O—$CH_3$, —O—$CH_2CH_3$, —O—$(CH_2)_2CH_3$ or —O—$(CH_2)_3CH_3$;

The residue —($C_{1-6}$-alkylene)-phenyl is preferably —($C_{1-4}$-alkylene)-phenyl, and more preferably —$CH_2$-phenyl;

The residue —($C_{1-6}$-alkylene)-phenylene-OH is preferably —($C_{1-4}$-alkylene)-phenylene-OH, and more preferably —$CH_2$-phenylene-OH;

R is a hydrogen atom of a $C_{1-6}$-hydrocarbon residue (e.g. linear or branched $C_{1-6}$-alkyl). R is particularly preferred as a hydrogen atom. This is the case, for example, when formaldehyde is used as aldehyde component in a condensation reaction with phenols in order to produce the benzyl ether resin of the formula (II);

$m^1$ and $m^2$ are each, independently, 0 or 1.

n is an integer from 0 to 100, preferably an integer from 1 to 50, more preferably from 2 to 10, and still more preferably from 2 to 5; and wherein the sum of n, $m^1$ and $m^2$ is at least 2.

In a still further embodiment, the polyol component is a phenol resin with monomer units based on cardol and/or cardanol. Cardol and cardanol are produced from cashew nut oil which is obtained from the seeds of the cashew nut tree. Cashew nut oil consists of about 90% anacardic acid and about 10% cardol. By heat treatment in an acid environment, a mixture of cardol and cardanol is obtained by decarboxylation of the anacardic acid. Cardol and cardanol have the structures shown below:

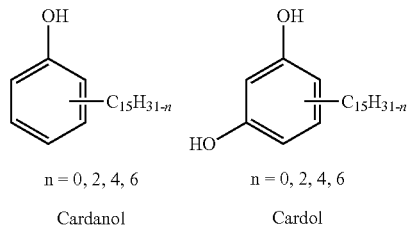

n = 0, 2, 4, 6   n = 0, 2, 4, 6
Cardanol          Cardol

As shown in the illustration above, the hydrocarbon residue (—$C_{15}H_{31-n}$) in cardol and/or in cardanol can have one (n=2), two (n=4) or three (n=6) double bonds. Cardol specifically refers to compound CAS-No. 57486-25-6 and cardanol specifically to compound CAS-No. 37330-39-5.

Cardol and cardanol can each be used alone or at any particular mixing ratio in the phenol resin. Decarboxylated cashew nut oil can also be used.

Cardol and/or cardanol can be condensed into the above described phenol resins, for example, into the resole- or novolak-type phenol resins. For this purpose, cardol and/or cardanol can be condensed e.g. with phenol or with one or more of the above defined compounds of the formula (I), and also with aldehydes, preferably formaldehyde.

The amount of cardol and/or cardanol which is condensed in the phenol resin is not particularly restricted and preferably is from about 1 wt % to about 99 wt %, more preferably about 5 wt % to about 60 wt %, and still more preferably about 10 wt % to about 30 wt %, relative to 100 wt % of the amount of phenolic starting products used in the phenol resin.

In another embodiment, the polyol component is a phenol resin obtained by condensation of cardol and/or cardanol with aldehydes, preferably formaldehyde.

A phenol resin which contains monomer units based on cardol and/or cardanol as described above, or which can be obtained by condensation of cardol and/or cardanol with aldehydes, has a particularly low viscosity and can thus preferably be employed with a low addition or without addition of reactive thinners. Moreover, this kind of long-chain, substituted phenol resin is comparatively hydrophobic, which results in a favorable shelf life of the coated proppants obtained by the method according to the present invention. In addition, a phenol resin of this kind is also advantageous because cardol and cardanol are renewable raw materials.

Apart from the phenol resin, the polyol component can still contain other compounds containing hydroxyl groups. The other compounds containing hydroxyl groups can be selected from the compounds containing hydroxyl groups that are known to be useful for making polyurethanes, e.g., hydroxy-functional polyethers, hydroxy-functional polyesters, alcohols or glycols. One preferred compound containing hydroxyl groups is, for instance, castor oil. Compounds containing hydroxyl groups such as alcohols or glycols, in particular cardol and/or cardanol, can be used as reactive thinners.

The amount of the other compounds containing hydroxyl groups depends on the desired properties of the proppant coating and can suitably be selected by the person skilled in the art. Typical amounts of compounds containing hydroxyl groups are in the range of between about 10 wt % and about 80 wt %, preferably from about 20 wt % to about 70 wt %, relative to 100 wt % of the polyol component.

The Isocyanate Component

The isocyanate component is preferably added to the coated proppants as the second component or as the sole component and comprises an isocyanate having at least 2 reactive isocyanate groups. Other isocyanate-containing compounds may be used, if desired. Examples of suitable isocyanate with at least 2 isocyanate groups an aliphatic or an aromatic isocyanate with at least 2 isocyanate groups (e.g. a diisocyanate, triisocyanate or tetraisocyanate), or an oligomer or a polymer thereof can preferably be used. These isocyanates with at least 2 isocyanate groups can also be carbocyclic or heterocyclic and/or contain one or more heterocyclic groups.

The isocyanate with at least 2 isocyanate groups is preferably a compound of the formula (III) or a compound of the formula (IV):

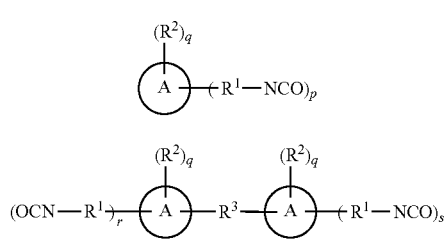

In the formulas (III) and (IV), A is each, independently, an aryl, heteroaryl, cycloalkyl or heterocycloalkyl. Preferably, A is each, independently, an aryl or cycloalkyl. More preferably A is each, independently, an aryl which is preferably phenyl, naphthyl or anthracenyl, and most preferably phenyl. Especially preferable A is a phenyl.

The above mentioned heteroaryl is preferably a heteroaryl with 5 or 6 ring atoms, of which 1, 2 or 3 ring atoms are each, independently, an oxygen, sulfur or nitrogen atom and the other ring atoms are carbon atoms. More preferably the heteroaryl is selected among pyridinyl, thienyl, furyl, pyrrolyl, imidazolyl, pyrazolyl, pyrazinyl, pyrimidinyl, pyridazinyl, oxazolyl, isoxazolyl or furazanyl.

The above mentioned cycloalkyl is preferably a $C_{3-10}$-cycloalkyl, more preferably a $C_{5-7}$-cycloalkyl.

The above mentioned heterocycloalkyl is preferably a heterocycloalkyl with 3 to 10 ring atoms (more preferably with 5 to 7 ring atoms), of which one or more (e.g. 1, 2 or 3) ring atoms are each, independently, an oxygen, sulfur or nitrogen atom and the other ring atoms are carbon atoms. More preferably the heterocycloalkyl is selected from among tetrahydrofuranyl, piperidinyl, piperazinyl, aziridinyl, acetidinyl, pyrrolidinyl, imidazolidinyl, morpholinyl, pyrazolidinyl, tetrahydrothienyl, octahydroquinolinyl, octahydroisoquinolinyl, oxazolidinyl or isoxazolidinyl. Still more preferably, the heterocycloalkyl is selected from among tetrahydrofuranyl, piperidinyl, piperazinyl, pyrrolidinyl, imidazolidinyl, morpholinyl, pyrazolidinyl, tetrahydrothienyl, oxazolidinyl or isoxazolidinyl.

In the formulas (III) and (IV), each $R^1$ is, independently, a covalent bond or $C_{1-4}$-alkylene (e.g. methylene, ethylene, propylene or butylene). Preferably each $R^2$ is a covalent bond.

In the formulas (III) and (IV), each $R^2$ is each, independently, a halogen (e.g. F, Cl, Br or I), a $C_{1-4}$-alkyl (e.g. methyl, ethyl, propyl or butyl) or $C_{1-4}$-alkyoxy (e.g. methoxy, ethoxy, propoxy or butoxy). Preferably, each $R^2$ is, independently, a $C_{1-4}$-alkyl. More preferably each $R^2$ is methyl.

In the formula (IV), $R^3$ is a covalent bond, a $C_{1-4}$-alkylene (e.g. methylene, ethylene, propylene or butylene) or a group —$(CH_2)_{R31}$—O—$(CH_2)_{R32}$—, wherein R31 and R32 are each, independently, 0, 1, 2 or 3. Preferably, $R^3$ is a —$CH_2$— group or an —O— group.

In the formula (III), p is equal to 2, 3 or 4, preferably 2 or 3, more preferably 2.

In the formulas (III) and (IV), each q is, independently, an integer from 0 to 3, preferably 0, 1 or 2. When q is equal to 0, the corresponding group A has no substitutent $R^2$, but has hydrogen atoms instead of $R^2$.

In the formula (IV), each r and s are, independently, 0, 1, 2, 3 or 4, wherein the sum of r and s is equal to 2, 3 or 4. Preferably, each r and s are, independently, 0, 1 or 2, wherein the sum of r and s is equal to 2. More preferably, r is equal to 1 and s is equal to 1.

Examples of the isocyanate with at least 2 isocyanate groups are: toluol-2,4-diisocyanate; toluol-2,6-diisocyanate; 1,5-naphthalindiisocyanate; cumol-2,4-diisocyanate; 4-methoxy-1,3-phenyldiisocyanate; 4-chloro-1,3-phenyldiisocyanate; diphenylmethane-4,4-diisocyanate; diphenylmethane-2,4-diisocyanate; diphenylmethane-2,2-diisocyanate; 4-bromo-1,3-phenyldiisocyanate; 4-ethoxy-1,3-phenyl-diisocyanate; 2,4'-diisocyanate diphenylether; 5,6-dimethyl-1,3-phenyl-diisocyanate; 2,4-dimethyl-1,3-phenyldiisocyanate; 4,4-diisocyanato-diphenylether; 4,6-dimethyl-1,3-phenyldiisocyanate; 9,10-anthracene-diisocyanate; 2,4,6-toluol triisocyanate; 2,4,4'-triisocyanatodiphenylether; 1,4-tetramethylene diisocyanate; 1,6-hexamethylene diisocyanate; 1,10-decamethylene-diisocyanate; 1,3-cyclohexylene diisocyanate; 4,4'-methylene-bis-(cyclohexylisocyanate); xylol diisocyanate; 1-isocyanato-3-methyl-isocyanate-3,5,5-trimethylcyclohexane (isophorone diisocyanate); 1-3-bis(isocyanato-1-methylethyl)benzol (m-TMXDI); 1,4-bis(isocyanato-1-methylethyl) benzol (p-TMXDI); oligomers or polymers of the above mentioned isocyanate compounds; or mixtures of two or more of the above mentioned isocyanate compounds or oligomers or polymers thereof.

Particularly preferred isocyanates with at least 2 isocyanate groups are toluol diisocyanate, diphenylmethane diisocyanate, an oligomer based on toluol diisocyanate or an oligomer based on diphenylmethane diisocyanate.

The process of the present invention is particularly useful when the proppants are coated with a condensation reaction product that has been made with an excess of isocyanate component with respect to the polyol component. In step (a) therefore, 100 parts by weight of the polyol component is used with about 105 wt % and about 500 wt %, preferably about 110 wt % to about 300 wt %, more preferably about 120 wt % to about 275 wt %, and still more preferably about 130 wt % to about 250 wt %, of the isocyanate base value.

The isocyanate base value defines the amount of the isocyanate component which is equivalent to 100 parts by weight of the polyol component. The NCO-content (%) of the isocyanate component is defined herein according to DIN ISO 53185. To determine the OH-content (%) of the polyol component, first the so-called OH-number is determined in mg KOH/g according to DIN ISO 53240 and this value is divided by 33, in order to determine the OH-content. Thus, an excess of NCO-groups in the isocyanate component of between about 5 and about 200%, preferably about 10 to about 130%, more preferably about 20% to about 120%, and still more preferably about 30% to about 100%, relative to the OH-groups in the polyol component is used (corresponding to the above mentioned amount of isocyanate component of about 105% to about 300%, preferably about 110% to about 230%, more preferably about 120% to about 220%, still even more preferably about 130% to about 200% of the isocyanate base value).

One or more additives can be mixed with the proppant, the polyol component and/or the isocyanate component during the coating and curing process. These additives are not particularly restricted and can be selected from the additives known in the specific field of coated proppants. Provided that one of these additives has hydroxyl groups, it should be considered as a different hydroxyl-group-containing compound, as described above in connection with the polyol component. If one of the additives has isocyanate groups, it should be considered as a different isocyanate-group-containing compound. Additives with hydroxyl groups and isocyanate groups can be simultaneously considered as different hydroxyl-group-containing compounds and as different isocyanate-group-containing compounds.

The Amine Component

The coating formulation of the present invention can also include a reactive amine component, such as an amine catalyst and preferably an amine-terminated compound that enhances crosslink density within the coating and which becomes part of the crosslinked coating. Particularly preferred reactive amine components for use in the present invention include amine-terminated compounds such as diamines, triamines, amine-terminated glycols such as the amine-terminated polyalkylene glycols sold commercially under the trade name JEFFAMINE from Huntsman Performance Products in The Woodlands, Tex.

Suitable diamines include primary, secondary and higher polyamines and amine-terminated compounds. Suitable compounds include, but are not limited to, ethylene diamine; propylenediamine; butanediamine; hexamethylenediamine; 1,2-diaminopropane; 1,4-diaminobutane; 1,3-diaminopentane; 1,6-diaminohexane; 2,5-diamino-2,5-dimethlhexane; 2,2,4- and/or 2,4,4-trimethyl-1,6-diaminohexane; 1,11-diaminoundecane; 1,12-diaminododecane; 1,3- and/or 1,4-cyclohexane diamine; 1-amino-3,3,5-trimethyl-5-aminomethyl-cyclohexane; 2,4- and/or 2,6-hexahydrotoluylene diamine; 2,4' and/or 4,4'-diaminodicyclohexyl methane and 3,3'-dialkyl-4,4'-diamino-dicyclohexyl methanes such as 3,3'-dimethyl-4,4-diamino-dicyclohexyl methane and 3,3'-diethyl-4,4'-diaminodicyclohexyl methane; aromatic polyamines such as 2,4- and/or 2,6-diaminotoluene and 2,6-diaminotoluene and 2,4' and/or 4,4'-diaminodiphenyl methane; and polyoxyalkylene polyamines (also referred to herein as amine terminated polyethers).

Mixtures of polyamines may also be employed in preparing aspartic esters, which is a secondary amine derived from a primary polyamine and a dialkyl maleic or fumaric acid ester, for use in the invention. Representative examples of useful maleic acid esters include dimethyl maleate, diethyl maleate, dibutyl maleate, dioctyl maleate, mixtures thereof and homologs thereof.

Suitable triamines and higher multifunctional polyamines for use in the present coating include diethylene triamine, triethylenetetramine, and higher homologs of this series.

JEFFAMINE diamines include the D, ED, and EDR series products. The D signifies a diamine, ED signifies a diamine with a predominately polyethylene glycol (PEG) backbone, and EDR designates a highly reactive, PEG based diamine.

JEFFAMINE D series products are amine terminated polypropylene glycols with the following representative structure:

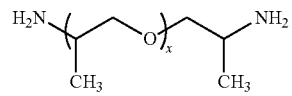

| JEFFAMINE® | x | MW* |
|---|---|---|
| D-230 | ~2.5 | 230 |
| D-400 | ~6.1 | 430 |
| D-2000 | ~33 | 2,000 |
| D-4000 (XTJ-510) | ~68 | 4,000 |

JEFFAMINE EDR-148 (XTJ-504) and JEFFAMINE EDR-176 (XTJ-590) amines are much more reactive than the other JEFFAMINE diamines and triamines. They are represented by the following structure:

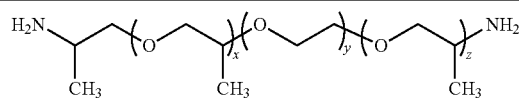

| JEFFAMINE® | y | x + z | MW* |
|---|---|---|---|
| HK-511 | 2.0 | ~1.2 | 220 |
| ED-600 (XTJ-500) | ~9.0 | ~3.6 | 600 |
| ED-900 (XTJ-501) | ~12.5 | ~6.0 | 900 |
| ED-2003 (XTJ-502) | ~39 | ~6.0 | 2,000 |

JEFFAMINE T series products are triamines prepared by reaction of propylene oxide (PO) with a triol intiator followed by amination of the terminal hydroxyl groups. They are exemplified by the following structure:

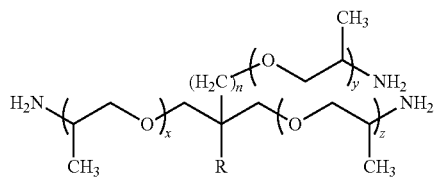

| JEFFAMINE® | R | n | Moles PO (x + y + z) | MW* |
|---|---|---|---|---|
| T-403 | C$_2$H$_5$ | 1 | 5-6 | 440 |
| T-3000 (XTJ-509) | H | 0 | 50 | 3000 |
| T-5000 | H | 0 | 85 | 5000 |

The SD Series and ST Series products consist of secondary amine versions of the JEFFAMINE core products. The SD signifies a secondary diamine and ST signifies a secondary trimine. The amine end-groups are reacted with a ketone (e.g. acetone) and reduced to create hindered secondary amine end groups represented by the following terminal structure:

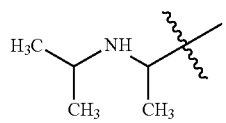

One reactive hydrogen on each end group provides for more selective reactivity and makes these secondary di- and triamines useful for intermediate synthesis and intrinsically slower reactivity compared with the primary JEFFAMINE amines.

| JEFFAMINE ® | Base Product | MW* |
|---|---|---|
| SD-231 (XTJ-584) | D-230 | 315 |
| SD-401 (XTJ-585) | D-400 | 515 |
| SD-2001 (XTJ-576) | D-2000 | 2050 |
| ST-404 (XTJ-586) | T-403 | 565 |

See also U.S. Pat. Nos. 6,093,496; 6,306,964; 5,721,315; 7,012,043; and Publication U.S. Patent Application No. 2007/0208156 the disclosure of which are hereby incorporated by reference.

Optional Amine-Based Latent Curing Agents

Amine-based latent curing agents can be optionally added to the coating formulation in the isocyanate component, the polyol component, the amine-reactive polyol component or added simultaneously as any of these components or precoated on the proppant. Suitable amine-based latent curing agents for use with the present invention become part of the crosslinked coating and include triethylenediamine; bis(2-dimethylaminoethyl)ether; tetramethylethylenediamine; pentamethyldiethylenetriamine; and other tertiary amine products of alkyleneamines. Additionally, other catalysts that promote the reaction of isocyanates with hydroxyls and amines that are known by the industry can be used in the present invention. Catalysts that become integrally part of the crosslinked coating are preferred.

Additives

The proppant coating compositions of the invention may also include various additives. For example, the coatings of the invention may also include pigments, tints, dyes, and fillers in an amount to provide visible coloration in the coatings. Other materials conventionally included in coating compositions may also be added to the compositions of the invention. These additional materials include, but are not limited to, reaction enhancers or catalysts, crosslinking agents, optical brighteners, propylene carbonates, coloring agents, fluorescent agents, whitening agents, UV absorbers, hindered amine light stabilizers, defoaming agents, processing aids, mica, talc, nano-fillers, fibers having a length: diameter ratio of greater than 1, reinforcing agents biocides, ion-exchange complexing agents and other agents that can remove dissolved heavy metals from subterranean water such as in copending U.S. patent application Ser. No. 13/224,726, surfactants, corrosion inhibitors, scale retarders, and other conventional additives. All of these materials are well known in the art and are added for their usual purpose in typical amounts. For example, the additives are preferably present in an amount of about 15 weight percent or less. In one embodiment, the additive is present in an amount of about 5 percent or less by weight of the coating composition.

Other additives can include, for example, solvents, softeners, surface-active agents, molecular sieves for removing the reaction water, thinners and/or adhesion agents can be used. Silanes are a particularly preferred type of adhesion agent that improves the affinity of the coating resin for the surface of the proppant. Silanes can be mixed in as additives in step (a), but can also be converted chemically with reactive constituents of the polyol component or of the isocyanate component. Functional silanes such as aminosilanes, epoxy-, aryl- or vinyl silanes are commercially available and, as described above, can be used as additives or can be converted with the reactive constituents of the polyol component or of the isocyanate component. In particular, amino-silanes and epoxy-silanes can be easily converted with the isocyanate component.

Proppant Core Solids

The proppants can be virtually any small solid with an adequate crush strength and lack of chemical reactivity. Suitable examples include sand, ceramic particles (for instance, aluminum oxide, silicon dioxide, titanium dioxide, zinc oxide, zirconium dioxide, cerium dioxide, manganese dioxide, iron oxide, calcium oxide or bauxite), resin-containing composite particles, or also other granular materials. The proppants to be coated preferably have an average particle size within the range from about 50 μm and about 3000 μm, and more preferably within the range from about 100 μm to about 2000 μm.

The proppant core solids are preferably preheated to a temperature within the range of 50° to about 225° C. before delivery into the mixer for coating and curing. The sensible heat carried into the mixer by the proppant solids helps to increase the reaction rate of the polymerization between the polyol and isocyanate. If desired, the mixer can be heated, but such additional energy costs may affect the economics of the coating process.

Using the Coated Proppants

Furthermore, the invention includes the use of the coated proppants in conjunction with a fracturing liquid for the production of petroleum or natural gas. The fracturing liquid is not particularly restricted and can be selected from among the frac liquids known in the specific field. Suitable fracturing liquids are described, for example, in W C Lyons, G J Plisga, *Standard Handbook Of Petroleum And Natural Gas Engineering*, Gulf Professional Publishing (2005). The fracturing liquid can be, for example, water gelled with polymers, an oil-in-water emulsion gelled with polymers, or a water-in-oil emulsion gelled with polymers. In one preferred embodiment, the fracturing liquid comprises the following constituents in the indicated proportions: 1000 liter water, 20 kg potassium chloride, 0.120 kg sodium acetate, 3.6 kg guar gum (water-soluble polymer), sodium hydroxide (as needed) to adjust a pH-value from 9 to 11, 0.120 kg sodium thiosulfate, and 0.180 kg ammonium persulfate. Current technology enables the transport of proppants of this invention using a "water carrier" without issues associated with the gelled systems.

In addition, the invention relates to a method for the production of petroleum or natural gas which comprises the injection of the coated proppant into the fractured stratum with the fracturing liquid, i.e., the injection of a fracturing liquid which contains the coated proppant, into a petroleum- or natural gas-bearing rock layer, and/or its introduction into a fracture in the rock layer bearing petroleum or natural gas. The method is not particularly restricted and can be implemented in the manner known in the specific field.

With the method according to the present invention proppants can be coated at temperatures between about 10° C. and about 150° C. and preferably in a solvent-free manner. The flow back effect can be controlled and adjusted in a reproducible manner. The coating process requires a comparatively little equipment and if necessary can also be carried out on a short-term basis in the vicinity of the bore.

EXAMPLES

Example 1

Comparative Coating Process

Typical charges to the reactor and timing sequences of a continuous tumble-type mixer are represented below:

TABLE 1

| Time (seconds) | Step |
|---|---|
| 0 | Add 4500 grams of uncoated proppant particles that have been preheated to 100° C. |
| 0 | Add 37.8 gms of castor oil over a 60 second period |
| 5 | Add 3.5 gms of a silane coupling agent to the mixing sand |
| 5 | Begin the addition of 13.5 gms of a reactive amine catalyst (JEFFCAT TR90) over 15 seconds |
| 10 | Begin the addition of 111.7 grams of poly-methylenediphenyldiisocyanate (poly-MDI having 31.5% NCO) over a 60 second period |
| 70-80 | Electrical load to motor increases, Remove lumps and solidified agglomerates |

Observations: The reactor mix in Example 1 processed well until a time of between 70-80 seconds at which point the mixture became a consolidated mass and lost the free-flowing form of individual grains. The motor to the mixer began to overload and required manual removal of the reactor contents which contained lumps and solidified agglomerates of polyurethane and proppant particles. The surfactant that was to be added at 90 seconds could not be added.

Example 2

Process According to the Invention

Example 2 repeated the cycle in Example 1 but with a change to move the addition of the surfactant to a point that was earlier into the cycle and to dissolve the surfactant in water.

TABLE 2

| Time (seconds) | Step |
|---|---|
| 0 | Add 4500 grams of uncoated proppant particles preheated to 100° C. |
| 0 | Add 37.8 grams of castor oil, over a 60 second period |
| 5 | Add 3.5 grams of a silane coupling agent to the mixing sand |
| 5 | Begin the addition of 13.5 gms of a catalyst (JEFFCAT TR90) over 15 seconds |
| 10 | Begin the addition of 111.7 gms of poly-methylenediphenyldiisocyanate (poly-MDI having 31.5% NCO) over a 60 second period |
| 70 | Add 2.3 gms of surfactant diluted with 7.5 gms water |
| 120 | Discharge free-flowing, coated and cured proppant solids |

Observations: The coating mix processed well throughout the cycle, retaining its character of free-flowing, individual solids. The motor to the mixer ran without issues.

Other variations on the sequence in Example 2 would include moving the water addition even early into the cycle, splitting the water addition into two or more steps and/or metering the water in substantially continuously to allow time for a reaction between the isocyanate and the water.

Once those skilled in the art are taught the invention, many variations and modifications are possible without departing from the inventive concepts disclosed herein. The invention, therefore, is not to be restricted except in the spirit of the appended claims.

What is claimed:

1. A method for the production of proppant that is coated with a polymeric coating, the method comprising:
   (a) coating free-flowing proppant solids in a mixer with a first component comprising a polyol;
   (b) adding to the mixer a second component comprising an isocyanate that has at least 2 reactive isocyanate groups and which is added at a controlled rate and volume sufficient to form a polymeric coating on said proppant solids; and
   (c) adding water to the mixer at about the time the isocyanate has begun to be added to the mixer at a rate and volume sufficient to retain the free-flowing characteristics of said proppant solids and addition of the water to the mixer does not conclude until all isocyanate has been added.

2. The method according to claim 1, wherein said proppant solid is selected from the group consisting of ceramic particles, composite particles, and sand.

3. A method according to claim 1, wherein the method further comprises adding a coupling agent and a catalyst to the mixer.

4. A method according to claim 1, wherein the water is added to said mixer when said isocyanate begins to be added to the mixer.

5. A method according to claim 1, wherein the polyol of said first component is a natural oil polyol, an aliphatic polyol, an aromatic polyol, or mixtures thereof.

6. A method according to claim 5, wherein said polyol of said first component comprises a natural oil polyol.

7. A method according to claim 6, wherein said natural oil polyol is castor oil.

8. A method according to claim 1, wherein said coating step a) is carried out at a temperature within the range from about 10 ° C. to about 250 ° C.

9. A method according to claim 1, wherein said proppant solid is preheated to a temperature within the range of 50° to 250 ° C. before contact with said first component.

10. A method according to claim 1, further comprising curing the coated proppant under conditions sufficient to produce a coated proppant that exhibits a loss of coating of less than 15 wt % when tested according to ISO 13503-5:2006(E).

11. A method according to claim 10, wherein said coating exhibits a loss of less than 5 wt %.

12. The method of claim 3, wherein the catalyst is a reactive amine catalyst.

13. The method of claim 3, wherein the coupling agent is a silane.

14. The method of claim 1, wherein the water is added to the mixer within about 5 to 15 seconds of when the isocyanate is added to the mixer.

15. The method of claim 1, wherein the water is completely added to the mixer from about 30 to 60 seconds.

16. The method of claim 1, wherein the water comprises a biocide.

* * * * *